A. RIEMENSCHNEIDER.
FEEDING MECHANISM FOR COTTON GINS.
APPLICATION FILED MAR. 9, 1911.
1,074,016.
Patented Sept. 23, 1913.
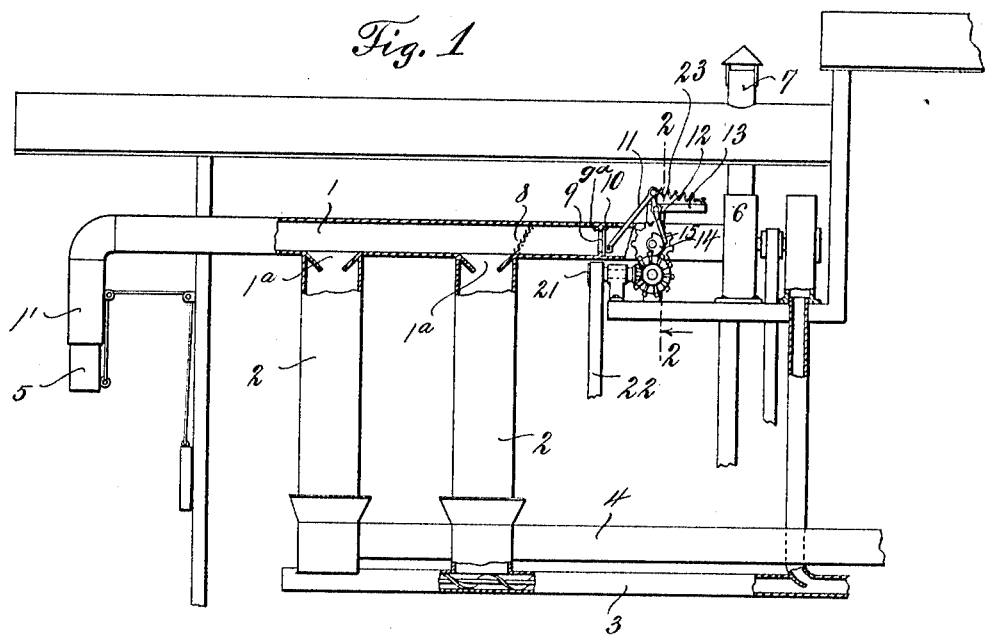
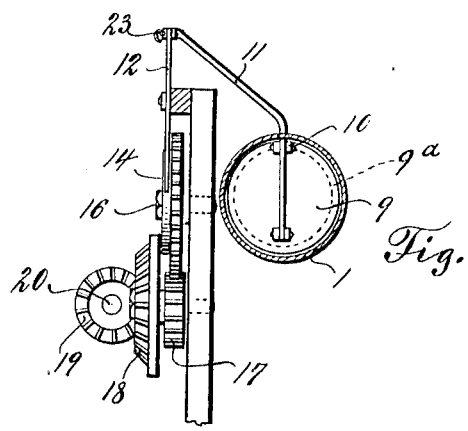
WITNESSES:
INVENTOR
A. Riemenschneider
BY
Attorneys

UNITED STATES PATENT OFFICE.

ADOLPH RIEMENSCHNEIDER, OF SARCO CREEK, TEXAS.

FEEDING MECHANISM FOR COTTON-GINS.

1,074,016.

Specification of Letters Patent.

Patented Sept. 23, 1913.

Original application filed March 1, 1910, Serial No. 546,729. Divided and this application filed March 9, 1911. Serial No. 613,343.

*To all whom it may concern:*

Be it known that I, ADOLPH RIEMEN-SCHNEIDER, a citizen of the United States, residing at Sarco Creek, in the county of Goliad and State of Texas, have invented certain new and useful Improvements in Feeding Mechanism for Cotton-Gins, being a division of my application for patent for gin plants, Serial No. 546,729, filed March 1, 1910.

The present invention relates to cotton ginning plants and consists primarily of peculiar mechanism controlling the feeding of the cotton supplied to the gins.

The novel features of the invention will be presented more clearly hereinafter, and for a full understanding of the same, reference is to be had to the accompanying drawings, in which—

Figure 1 is a side elevation of certain parts of a ginning plant, illustrating more particularly the gins, supply pipe leading thereto and the feed controlling mechanism associated therewith; Fig. 2 is a sectional view taken about on the line 2—2 of Fig. 1, and bringing out more clearly the parts of the feed mechanism.

Throughout the following detail description and on the several figures of the drawings, similar parts are referred to by like reference characters.

Referring particularly to the drawings 1 denotes the usual supply pipe employed in a cotton ginning plant, and leading from a point exterior to the ginning room to the several gins 2. The gins 2 may be of any conventional type and a seed conveyer 3 leads from their lower ends as well as a lint delivery pipe 4, the latter extending to a suitable condenser, not shown. The outer end of the supply pipe 1 is provided with a downwardly turned portion 1' carrying a telescopic section 5 adapted to be lowered into a wagon, from which the cotton is taken in its crude state and delivered to the ginning plant.

The end of the supply pipe 1 opposite the portion 1' leads to a blower 6 from which extends the ventilator 7, said blower being of any conventional type and creating a suction in the pipe 1 sufficiently to draw the cotton from the wagons to deliver the same in proper quantities to the gins 2. A partition 8 of foraminous material is located in the length of the supply pipe 1 and situated just beyond the point where said supply pipe has its delivery opening 1ᵃ leading to the gin 2 more remote from the outer end 1' of said supply pipe. During the operation of the ginning plant, the blower 6 creates a suction in the pipe 1', drawing the cotton to the gins 2, and the feeding mechanism comprising this invention is designed to intermittently cut off the suction of air in the pipe 1, with respect to the blower 6, generating said suction. The feeding mechanism consists preferably of a valve 9 located between the blower 6 and the foraminous partition 8, and pivoted at its upper end, as shown at 10. The valve 9 engages a fixed annular valve seat 9ᵃ, as shown. The free lower end portion of the valve 9 is connected by an operating rod 11 with a lever 12 pivoted between its ends to a bracket 13 adjacent to the supply pipe 1. The rod 11 is connected with the upper end of the lever 12 and the lower end of said lever operates in contact with a cam 14 carried by the outer side of a gear 15, the latter being supported by an axis 16. The gear 15 is in mesh with a spur-gear 17 driven by a bevel gear 18 which meshes with a bevel gear 19 on the drive shaft 20, said drive shaft being driven by a pulley 21 and belt 22, the latter connected with a suitable source of power.

Under normal conditions a spring 23 connected at one end to the bracket 13 and at the other end to the upper end of the lever 12, tends to hold said lever in engagement with the cam 14. Cam 14, as apparent from Fig. 1, is constructed with approximately one-half of its circumference having a greater radius than the other half, the meeting halves being connected by abrupt shoulders whereby rotation of the cam in one direction is rendered impossible because of the resultant engagement of one of the shoulders with the lower end of lever 12, but the cam is free to rotate clockwise, that is from left to right above the axis, the lower end of the lever 12 dropping off of one shoulder as it passes from the enlarged portion of the cam, that is, passes from the portion having the greater radius to the reduced portion, or portion having less radius, the opposite shoulder during the continued rotation of the cam striking the lever 12 above its lower end, the lever being disposed at an incline to the vertical, and the shoulder thus swinging the lever laterally on its pivot and imparting a longitudinal forward thrust to the link 11 whereby the valve 9 is positively and continually closed against the pressure of the spring 23, supplemented by the atmospheric pressure rendered active by the exhaust from fan 6. The valve 9 will remain closed so long as lever 12 is engaged by the enlarged portion of cam 14, and during the continued rotation of the cam, when the enlarged portion passes the lower end of the lever, and allows the lower end of the lever to swing toward the axis of the cam, the upper end will be permitted to swing in an opposing direction, and under the stress of the spring 23, will move link 11 in a direction for opening valve 9, the valve being opened by the pull of the spring, supplemented by the atmospheric pressure acting against the face of the valve.

Having thus described the invention, what is claimed as new is:

1. In a device of the class described, the combination, with a suction pipe having an intake and an exhaust, a gin receiver communicating therewith intermediate its ends, means for exhausting air from the pipe through the exhaust end, a valve adapted to be closed against the exhaust, said valve being disposed within the pipe between the gin receiver and the exhaust means, a pivotally mounted lever having one end connected with the valve for actuating the same, a cam engaging the lever and shaped to move the lever upon its pivot in a direction for closing the valve, and means for rotating the cam for effecting the closing movement, the cam being formed with the reduced portion permitting movement of the lever to a position with the valve open.

2. In a device of the class described, the combination, with a suction pipe having an intake and an exhaust, a gin receiver communicating therewith intermediate its ends, means for exhausting air from the pipe through the exhaust end, a valve adapted to be closed against the exhaust, said valve being disposed within the pipe between the gin receiver and the exhaust means, a pivotally mounted lever having one end connected with the valve for actuating the same, a cam engaging the lever and shaped to move the lever upon its pivot in a direction for closing the valve, means for rotating the cam for effecting the closing movement, the cam being formed with the reduced portion permitting movement of the lever to a position with the valve open, and a spring connected with the lever for subjecting the same to spring pressure in a direction tending to open the valve.

3. In a device of the class described, the combination, with a suction pipe having intake and exhaust ends, a gin receiver communicating with the pipe intermediate the ends, a valve within the pipe hinged to swing to and from a closed position and disposed between the gin receiver and exhaust end of the pipe, a fan communicating with the exhaust end of the pipe for exhausting air from the pipe, a rotatably mounted cam having an enlargement and a reduced portion with shoulders connecting the enlargement with the reduced portion, means for rotating the cam, a pivotally mounted lever having a free end resting against the cam and adapted to be swung by the engagement of the enlargement with a portion of the lever, the lever being free to swing in the opposite direction when disconnected from the enlargement of the cam, a link pivotally connected to the lever at the opposite side of the pivot of the lever from that of the free end, said link being pivotally connected to the valve at that side of the valve adapted to close the valve during the movement of the lever under actuation by engagement with the enlarged portion of the cam with the lever.

In testimony whereof I affix my signature in presence of two witnesses.

ADOLPH RIEMENSCHNEIDER.

Witnesses:
L. J. LUTENBACHER,
J. C. BURNS.

---

Copies of this patent may be obtained for five cents each, by addressing the "Commissioner of Patents. Washington, D. C."